Figure 1:
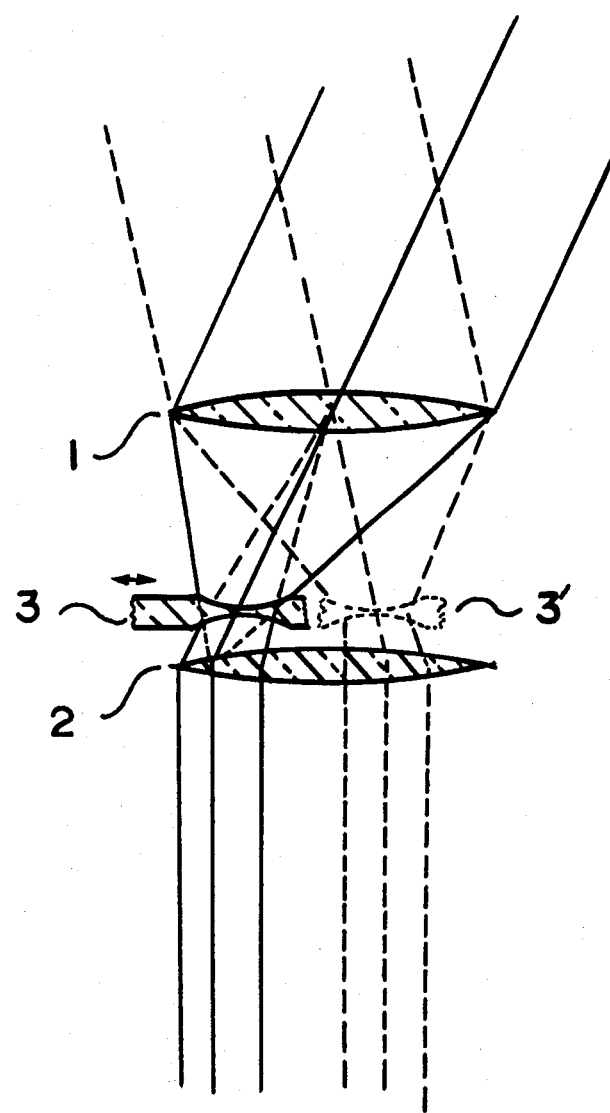

United States Patent
Herbert

4,050,789
Sept. 27, 1977

[54] TRACKING LENS SYSTEM FOR SOLAR COLLECTORS AND SKYLIGHTS

[76] Inventor: Edward Herbert, Rte. 44, Canton, Conn. 06019

[21] Appl. No.: 677,153

[22] Filed: Apr. 15, 1976

[51] Int. Cl.² .......................... G02B 9/16; G02B 7/02; F24J 3/02
[52] U.S. Cl. .................................... 350/226; 350/247; 350/285; 126/270
[58] Field of Search ................... 350/285, 226, 247, 6; 126/270

[56] References Cited

U.S. PATENT DOCUMENTS

| 3,206,608 | 9/1965 | Aulin | 350/6 |
| 3,254,227 | 5/1966 | Hock | 350/247 |

*Primary Examiner*—John K. Corbin
*Assistant Examiner*—Conrad Clark

[57] ABSTRACT

A tracking lens system for solar collectors or skylights comprises a first array of condensing lenses, a movable array of diverging lenses, and a second array of condensing lenses. By moving the array of diverging lenses, sunlight incident from any small angle can be tracked. The light leaving the tracking lens system can be parallel rays coaxial with the lens system, or can be focused upon a collecting means.

2 Claims, 1 Drawing Figure

TRACKING LENS SYSTEM FOR SOLAR COLLECTORS AND SKYLIGHTS

BACKGROUND OF THE INVENTION

This invention relates to solar energy collectors of the concentrating type, and to skylights.

Most devices used to collect and condense sunlight are mounted on gimbals so as to point the device toward the sun. Some rotate a lens system about its focal point, which is often a pipe. Others have a fixed lens systems, and move the collecting pipe to follow the locus of the focal point for different angles of incident sunlight. Others use multiple collectors arranged so that one or two are at the focal point for any angle of incident sunlight. Others yet use rotating mirrors or prisms to focus the sunlight on the collector.

OBJECTS OF THE INVENTION

It is the object of the invention to provide a component for a solar collector of the concentrating type which allows tracking of the sun by moving a small element thereof in a simple manner.

Another object of the invention is to provide a skylight which can direct sunlight to illuminate a particular area regardless of the sun's position.

SUMMARY OF THE INVENTION

The objects of the invention are acheived by providing a first condensing lens, a movable diverging lens and a second condensing lens.

The first condensing lens and the movable diverging lens form a compound lens having a virtual focal point located at the first condensing lens. The movable diverging lens can be moved sideways so that the center of the diverging lens intercepts the axis of the incident sunlight. Properly adjusted, the sunlight will be focused at the virtual focal point for any small angle of the incident sunlight.

The second condensing lens then focuses the sunlight as desired. If the second condensing lens has its front focal point colocated with the virtual focal point of the compound combination of the first condensing lens and the movable diverging lens, then the sunlight will leave as parallel rays, coaxial with the optical axis of the second condensing lens.

For use in a solar collector or skylight, many lenses would be molded in three sheets of plastic. By sliding the center sheet, the collector would track the sun for any small angle.

BRIEF DISCRIPTION OF THE DRAWING

FIG. 1 shows a section through the tracking lens system. The paths of two different beams of sunlight are shown, with the movable lens shown in the two positions to properly align the transmitted light.

DISCRIPTION OF THE INVENTION

FIG. 1 shows the elements of the invention devoid of mounting means, moving means, tracking servos or clockworks and whatnot, and without illustrating the various means to further condition and focus the light. These considerations are mere mechanical details, and the precise implementation of them is not germane to the fundamentals of the invention.

The development of the invention is simple. Sunlight incident upon the first condensing lens 1 will be condensed so as to form a cone, the axis of which is coaxial with the incident light, and the apex of which would fall upon the focal plane of the lens.

A movable diverging lens 3 is adjusted to intercept this cone of light so that the axis of the cone of light passes through the center of the lens. The focal length of the diverging lens 3 and its spacing to the first lens 1 are chosen so that the compound lens formed by the combination of the first lens 1 and the diverging lens 3 have a virtual focal point at the first lens 1. The light emitting from the diverging lens 3 will therefor appear to originate at a point, at the center of the first lens 1.

FIG. 1 illustrates a second condensing lens 2 positioned such that its front focal point is colocated with the virtual focal point of the compound combination of the first condensing lens 1 and the movable diverging lens 3. With this arrangement, the light emitted from the second condensing lens 2 will be parallel to the optical axis of the second condensing lens 2.

FIG. 1 also illustrates a condition in which the movable diverging lens 3 has been moved 3' to accomodate sunlight arriving at a different angle.

For use as an element of a solar collector, the tracking lens system could be used in a number of ways. The first condensing lens 1 and the movable lens 3 could be used with an elliptical reflector to concentrate the sun's rays at a point; or, the second condensing lens could be designed to focus upon a point; or, the parallel beam output as illustrated in FIG. 1 could be directed into a parabolic reflector and thereby focused upon a point.

However, I envision the most practical arrangement of the invention for a solar collector to comprise large sheets of rigid, transparent plastic unto which are molded many lenses, perhaps on a hexagonal matrix. The first and second condensing lenses could be molded as identical sheets, with stiffening ribs which also serve to maintain correct spacing. The movable lenses would also be molded into a sheet, which would slide between the other two lens sheets, and would be positioned by servo or clockwork controls acting on the edge of the moveable sheet.

Several techniques could be used then to collect the output beams of the several various tracking lens elements. The parallel beams could be focused to a point or line by a parabolic reflector or a large fresnel lens. The individual second condensing lens elements could be molded wedge shaped, or with an inclination in their optical axes so as to direct the individual beams to a focal point or line.

Another method of collecting the individual beams would be to introduce intentional "errors" into the position of the individual movable diverging lenses, which would cause the emitted beams to deviate from their normal axial direction. The movable lenses toward the edges of the sheet could be positionally offset so as to bend their beams inward toward a common focal point or line.

The second condensing lens could be of the Fresnel type without degradation of performance. Using Fresnel lenses for the other two lenses would degrade performance at other than axial incipient sunlight.

The multi-element tracking lens system would find application in skylights as well as in solar collectors. With appropriate controls, light could be directed upon a particular area, such as toward the altar of a church or an indoor garden, or down a light shaft.

In a solar collector of the type having a trough-like parabolic reflector with a pipe at its focus, a tracking lens system could be made with molded or extruded linear lenses of the correct section, with each lens being as long as the collector. Such a lens would need correct for angle in one plane only, and thus would need a position correction of the movable lens in one direction only. If the collector were positioned in an east-west direction, inclined generally toward the sun, adjustment for inclination would need to be made infrequently, and thus would not need automatic controls.

For applications requiring more precise focusing of the sun's rays, a cam like means might be used to vary the spacing of the movable diverging lens to the first condensing lens so as to maintain the correct focal point of the compound combination of the first condensing lens and the movable diverging lens. Alternatively, since the sunlight passes through the edge of the second condensing lens for wider angles of incident sunlight, and near the center for smaller angles, the second condensing lens could have a varying focal length across its section so that for any position of the movable lens, the focal point of the second condensing lens would be more nearly colocated with the focal point of the compound combination of the first condensing lens and the movable diverging lens.

I claim

1. A tracking lens system capable of tracking incident sunlight over any small angle, comprising
    a condensing lens
    a diverging lens, the diverging lens forming a compound lens with the condensing lens such that the focal point of the compound lens is virtual, and is located at the condensing lens,
    position means to move the diverging lens so that the center of the diverging lens intercepts the axis of the incident sunlight beam, and
    additional focusing means to concentrate the sunlight upon a focal point.

2. A tracking lens system capable of tracking incident sunlight over any small angle, comprising
    a first condensing lens,
    a diverging lens, the diverging lens forming a compound lens with the first condensing lens such that the focal point of the compound lens is virtual, and is located at the first condensing lens,
    positioning means to move the diverging lens so that the center of the diverging lens intercepts the axis of the incident sunlight, and
    a second condensing lens having its front focal point colocated with the virtual focal point of the compound lens combination of the first condensing lens and the movable diverging lens.

* * * * *